(12) United States Patent
Wells et al.

(10) Patent No.: US 10,922,688 B2
(45) Date of Patent: Feb. 16, 2021

(54) COMPUTER-IMPLEMENTED SYSTEM AND METHOD FOR PERFORMING SOCIAL NETWORK SECURE TRANSACTIONS

(71) Applicant: SMARTBOTHUB, INC., Kirkland, WA (US)

(72) Inventors: Andrew Alan Wells, Madeira Beach, FL (US); Alkarim "Al" Lalji, Kirkland, WA (US)

(73) Assignee: SmartBotHub, Inc., Kirkland, WA (US)

( * ) Notice: Subject to any disclaimer, the term of this patent is extended or adjusted under 35 U.S.C. 154(b) by 304 days.

(21) Appl. No.: 15/898,410

(22) Filed: Feb. 16, 2018

(65) Prior Publication Data

US 2019/0272540 A1 Sep. 5, 2019

Related U.S. Application Data

(60) Provisional application No. 62/460,050, filed on Feb. 16, 2017.

(51) Int. Cl.

| | |
|---|---|
| *G06Q 20/02* | (2012.01) |
| *G06Q 20/22* | (2012.01) |
| *G06Q 20/38* | (2012.01) |
| *G06Q 20/40* | (2012.01) |
| *G06Q 50/00* | (2012.01) |

(Continued)

(52) U.S. Cl.
CPC ........ *G06Q 20/401* (2013.01); *G06Q 20/02* (2013.01); *G06Q 20/042* (2013.01); *G06Q 20/223* (2013.01); *G06Q 20/34* (2013.01); *G06Q 20/385* (2013.01); *G06Q 20/389* (2013.01); *G06Q 20/3821* (2013.01); *G06Q 20/3823* (2013.01); *G06Q 50/01* (2013.01)

(58) Field of Classification Search
None
See application file for complete search history.

(56) References Cited

U.S. PATENT DOCUMENTS

| 10,037,521 | B1* | 7/2018 | Botros | ............... G06Q 20/16 |
| 2007/0208816 | A1 | 9/2007 | Baldwin et al. | |

(Continued)

FOREIGN PATENT DOCUMENTS

WO 2016187662 12/2016

*Primary Examiner* — Joseph W. King
(74) *Attorney, Agent, or Firm* — Krista A. Wittman; Patrick J. S. Inouye; Leonid Kisselev (57) ABSTRACT

A computer-implemented system and method for performing social network secure transactions is provided. A list of payment recipients each associated with a hashtag is maintained for a user. A chat session of the user is monitored on a social network platform. During the chat session, a message associated with one of the hashtags and indicating a possible transfer of funds is identified from the user. Transfer of the chat session to a secure payment platform is triggered based on the identified message. A message also associated with the hashtag and having encrypted payment information for a payment transaction is received via the secure payment platform. The payment information is decrypted and validation of the decrypted payment information is performed for the transaction. A transfer of the user to the social network platform is triggered and a notification of validation is transmitted to the recipient associated with the message hashtag.

20 Claims, 5 Drawing Sheets

(51) Int. Cl.
*G06Q 20/04* (2012.01)
*G06Q 20/34* (2012.01)

(56) References Cited

U.S. PATENT DOCUMENTS

| | | |
|---|---|---|
| 2012/0158589 A1 | 6/2012 | Katzin et al. |
| 2014/0052633 A1 | 2/2014 | Gandhi |
| 2014/0052636 A1* | 2/2014 | Mattes ................ G06Q 20/409 705/44 |
| 2015/0278775 A1* | 10/2015 | Kosloski ................ G06Q 50/01 705/39 |
| 2017/0200155 A1 | 7/2017 | Fourez et al. |
| 2017/0249689 A1 | 8/2017 | O'Neil et al. |

* cited by examiner

COMPUTER-IMPLEMENTED SYSTEM AND METHOD FOR PERFORMING SOCIAL NETWORK SECURE TRANSACTIONS

CROSS-REFERENCE TO RELATED APPLICATION

This U.S. patent application claims priority under 35 U.S.C. § 119(e) to U.S. Provisional Patent Application, Ser. No. 62/460,050, filed Feb. 16, 2017, the disclosure of which is incorporated by reference.

FIELD

The invention relates in general to processing transactions and, in particular, to a computer-implemented system and method for performing social network secure transactions.

BACKGROUND

As the use of computing devices increases, companies are focusing on ways to allow users to perform everyday functions via their mobile devices, including shopping, banking, networking, and ridesharing, as well as many other services. For example, with respect to banking, a user can now access their account online and deposit or transfer money. Currently, a user can deposit money in their account by taking a picture of a check and uploading the picture to a bank of the user. However, a monetary limit for utilizing the picture deposit feature often exists and thus, is not available for all deposits. Further, the deposit can only occur with the user's bank and a transfer feature from one bank to another is not offered.

However, direct monetary transfer can occur between individuals via computing devices using conventional services, such as Venmo, of Venmo, LLC. Venmo is a mobile payment service that allows transfer of funds between mobile devices via a mobile application. Each user sets up an account and can link their bank accounts, debit cards or credit cards to the account, which can be used to pay other individuals. Also, whenever a user makes a transaction, details of the transaction can be shared with other users associated with the user. However, Venmo requires a user to access the mobile application from which the transfers can be made, rather than utilizing applications already in use by a user.

Accordingly, a need exists for easy and secure transfer of money locally and internationally, while ensuring funds are available for the transfer. Preferably, the funds are transferred via social networking sites, which are commonly used.

SUMMARY

For easy and efficient funds transfer, a user can utilize commonly used social media sites to transfer those funds. The user takes a photograph of a form of payment, such as a check, credit card, or debit card and uploads an encrypted version of the photo to a particular social media page using a hashtag. Upon sending of the message, the encrypted photo is decrypted and the payment is validated. Subsequently, upon validation, the recipient of the payment is notified and provided with a link to access the payment, which can then be deposited into one or more accounts of the recipient.

One embodiment provides a computer-implemented system and method for performing social network secure transactions. A list of payment recipients each associated with a hashtag is maintained for a user. A chat session of the user is monitored on a social network platform. During the chat session, a message associated with one of the hashtags and indicating a possible transfer of funds is identified from the user. Transfer of the chat session to a secure payment platform is triggered based on the identified message. A message also associated with the hashtag and having encrypted payment information for a payment transaction is received via the secure payment platform. The payment information is decrypted and validation of the decrypted payment information is performed for the transaction. A transfer of the user to the social network platform is triggered and a notification of validation is transmitted to the recipient associated with the message hashtag.

Still other embodiments of the invention will become readily apparent to those skilled in the art from the following detailed description, wherein are embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Social network sites are commonly used by individuals across the world to communicate with one another. As the popularity of such sites increases, new features are frequently being added to attract users and facilitate interaction between individuals, and individuals and organizations, such as businesses, non-profit organizations, and social interest groups. Currently, users are able to purchase gifts for delivery to social network "friends," such as on Facebook, but unable to transfer payment to other individuals or organizations, such as for debts or donations. Generally, many social network sites fail to comply with safety standards for payment, including the Payment Card Industry Data Security Standard, and thus, are not considered safe for funds transfer. Allowing social media users to transfer money or make payments to other individuals or organizations via social media sites and validating such payments provides an efficient and secure method of funds transfer, while utilizing media already in use.

Figure 1:
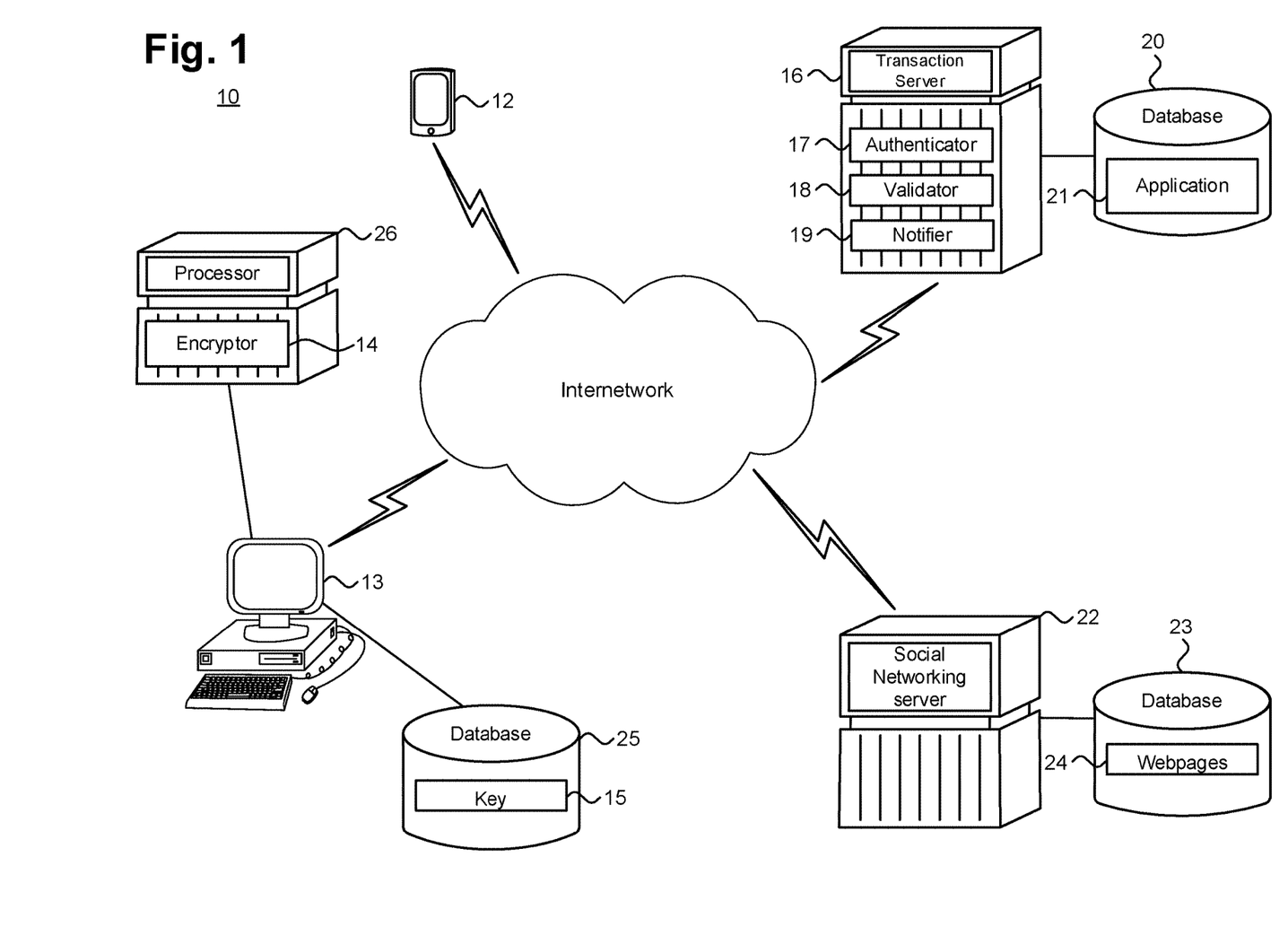
FIG. 1 is a block diagram showing a system for performing social network secure transactions, in accordance with one embodiment.

Secure payment via a social network site is possible by allowing a user to communicate with a recipient via a common social networking site and then seamlessly transferring the user to a different communication platform for securely receiving and validating payment information without the user's knowledge of the transfer. FIG. 1 is a block diagram showing a system 10 for performing social network secure transactions, in accordance with one embodiment. A user needing to pay a bill or transfer money to another individual can access a transaction application 21 via a computing device, such as a desktop computer 12 or a mobile computing device 13, including a mobile phone, tablet, or laptop computer. Other computing devices are possible. The transaction application 21 can be stored in a database 20 associated with a transaction server 16. If not previously generated, the user can create a profile by entering personally identifiable information, including user name, password, and payment sources, such as bank account number, bank name, check routing number, or credit card. Other types of personally identifiable information are possible.

Prior to, during, or after creating a profile, an identity of the user should be authenticated or verified before a transaction is performed. Additionally, the user can be verified by the transaction application 21 or the social network through which the transfer of funds is performed. For example, once the user logs into a social media platform for transferring funds, the user will be challenged to authenticate herself before the payment is released via an authenticator 17 of the transfer server 16. Specifically, the authenticator 17 authenticates the user via the computing device 12, 13 which the user is using by accessing and verifying an identification number associated with the computing device 12, 13. Additionally, the user can be verified when the user logs in to the transaction application 21 or sends a message for delivery via the computing device, which is recognized as belonging to the user. Other methods of authentication are possible.

Once authenticated, the user can transfer money or pay bills using the payment sources provided in the user profile. To make a payment or transfer money, the user can access a particular web page 24, such as a social network site, for performing the transfer. The web page 24 can be stored in a database 23, which is interconnected to a social networking server 22 that delivers the web page 24 to the computing device 12, 13 associated with the user. Next, the user generates a post via the social networking page and provides the payment information, such as payment amount and payment source, which is encrypted via an encryptor 14 and posted directly on the social networking page. Prior to encryption, an encryption key 15, specific to the user, is accessed from a database 25 of the computing device 12, 13. The encryptor 14 can be executed by a processor 26 of the computing device 12, 13.

The post can also include a hashtag which is associated with a recipient of the payment. For instance, the user can use the hashtag #realestatepayment to pay his mortgage or #seantransfer to send money to a friend, the hashtags are unique to a user, especially when associated with a social media network. The hashtags and associated recipients can be stored in the user profile. For example, the user can select one or more hashtags from a list of pre-generated hashtags and then provide identification information for the recipient of a payment to be associated with the hashtag. In one instance, the user associates the hashtag #realestatepayment with his mortgage holder, ABC Mortgage, by providing identifying information, such as the name of the mortgage company, a street address, email address, social network address, or bank information, as well as other types of information. Once all the information has been provided, the recipient can be added to the user's contact list using the link. In one embodiment, the contact can be generated for all social media accounts listed in the user's profile. However, in a further embodiment, the contact is generated for only those social media accounts selected by the user.

In one embodiment, the message with the encrypted payment source is delivered to the transaction server 16; however, in a further embodiment a new message with a link to the payment information is delivered, as further described below. A validator 18 performs validation of the payment information, including determining whether the user is associated with the payment source and the payment source is able to fund the payment amount. The message can be transmitted to both the recipient and the sender based on configuration. Once validated, a notifier 19 generates and delivers a notification of the payment to the intended recipient.

The mobile computing devices and servers can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, as integrated circuitry and each of the client and server can act as a specialized computer. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
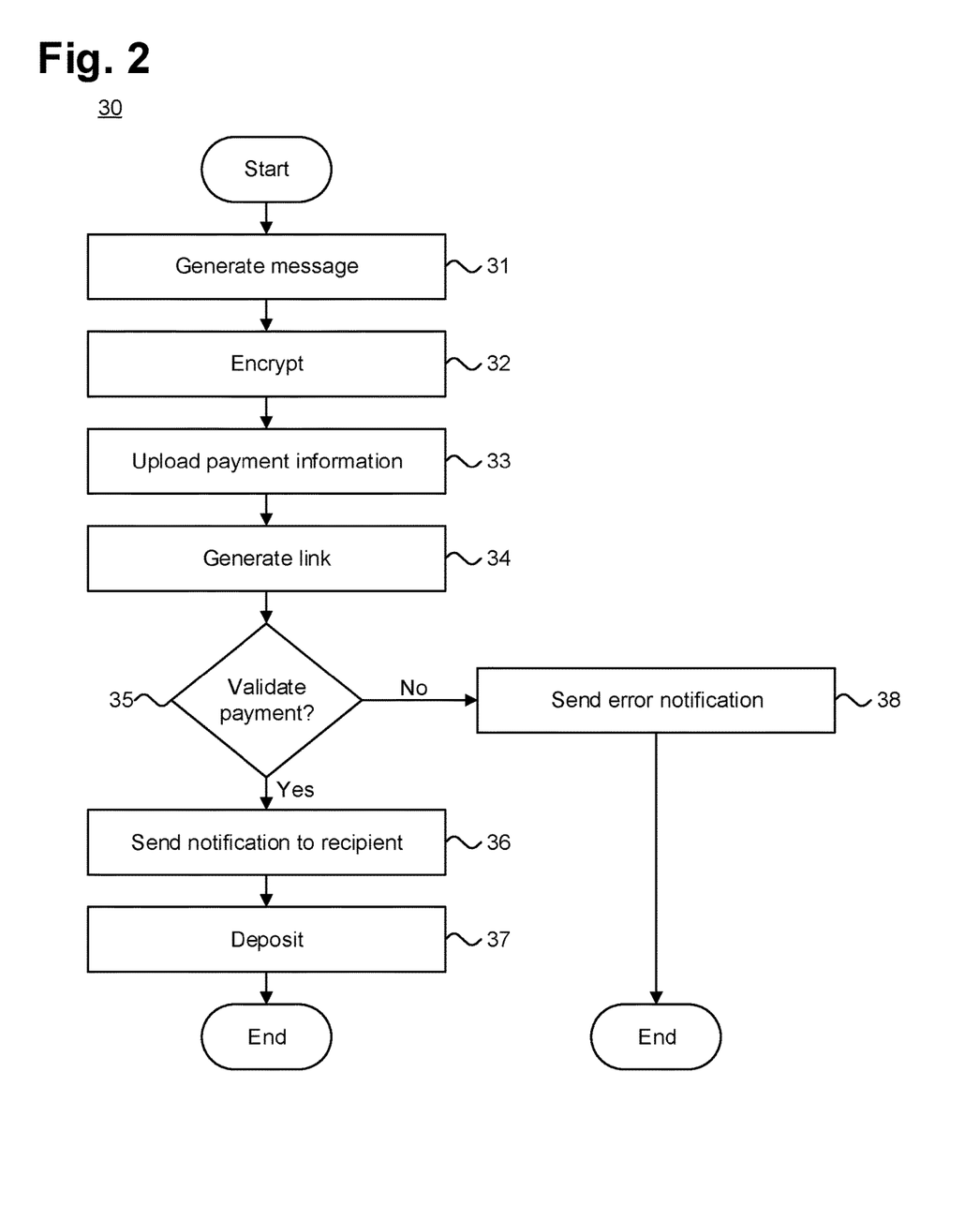
FIG. 2 is a flow diagram showing a method for performing social network secure transactions, in accordance with one embodiment.

FIG. 2 is a block diagram showing a method 30 for performing social network secure transactions, in accordance with one embodiment. A user generates (step 31) a message, such as a post on Facebook, a tweet on Twitter, a snap on Snapchat, or other type of message and identifies payment information to be provided in the message. The payment information can include recipient name, amount of payment, payment source, and note to the recipient, as well as other types of information. The payment sources can include check, debit card, credit card, or other sources and can be provided in the message as text or a photograph. At least a portion of the payment information is encrypted (step 32) using an encryption key of the user. For instance, the payment amount and payment source can be encrypted to ensure privacy of the user's sensitive information and prevent unauthorized access to the user's account.

The user then uploads (step 33) payment information in the message. If the payment source is provided as a photograph, a link is generated (step 34) for the photograph via a new message to/from the contact, which can also include at least some of the other payment information based on the payment source. For example, most of the necessary information for performing a transaction is provided via a check; however, when using a credit card, additional information is necessary, such as payment amount.

The message, once sent or posted by the user via the social media platform, can be delivered to the transfer server for performing validation (step 35). Alternatively, the new message with the payment source link can be delivered to the transfer server for validation. The validation process can include determining whether the user is associated with or has a relationship with the payment source provided, including a provider of the payment source, such as a bank, credit union, or lender. Validation can also include determining whether the user's signature is correct and whether funds of the payment source can fulfill the payment.

In one embodiment, validation can be performed by assigning a validation score to the payment information. For example, each piece of payment information can be assigned a score between 0 and 1. Alternatively, a binary score of either 0 or 1 can be assigned. The validation score is then calculated by summing the score for each piece of payment information.

If the payment information is not validated, no payment is transferred to the recipient and the user is notified (step 38) of the error. If the total validation score passes a predetermined threshold, the user's payment information is determined to be validated and a notification message is sent (step 36) to the recipient via one or more social network sites, including Facebook, Snapchat, and Twitter. The social network site to which the notification for the recipient is sent can be the same or different that the site from which the user sent the payment.

The notification message can include a link to access the payment, as well as further information, such as a name of the sender, a note indicating why the payment is being sent, and a date and time of the notification. Once received, the recipient can click on the link to access the payment, which is provided by the transaction application 21. The recipient can have one or more accounts stored in his profile with the transaction application 21 and upon accessing the payment via the link, can transfer the money to at least one of the stored accounts. Further, the payment is stored in a record, which the recipient can access via the transaction application 21 to view a list of all messages received from one or more users across different social network sites.

In one example of funds transfer via social media, Leslie wants to pay her mortgage to Mortgage One Bank and wishes to pay by check via Facebook Messenger. Thus, Leslie fills out the check, including recipient name, payment amount, date and signature, and takes a photograph of the check, which is encrypted on the computing device used by Leslie. The check is issued from BECU in the amount of $4,052. Leslie then uploads the photograph of the check to a message in Facebook Messenger for sending to her mortgage lender and includes the hashtag #mortgagepayment. Once sent, the message is received by the transaction server, which utilizes the link to access and decrypt the payment information, using for instance an encryption key associated with the user. Once decrypted, the transaction server can perform a validation check on the payment information.

In this example, the validation process utilizes a continuous scoring scale to verify the user's payment information, including bank name, account number, signature and available funds, and a predetermined threshold of 90%, or 3.6, is used. During validation, Leslie is determined to have an account at BECU in her name and is named on the specific account on which the check is written. A value of 1 is assigned to each of the bank and account information. Leslie's signature was determined to be a 95% match to a signature on file with the transaction server and a value of 0.95 is assigned. Additionally, a check performed on an amount of available funds in Leslie's checking account determined with a 95% certainty that sufficient funds were available to cover the payment. Thus, the validation score is 3.9 or 98%, which exceeds the predetermined threshold to validate the payment information.

Once validated, a notification message is generated and transmitted to the recipient of the payment, Mortgage One Bank. The notification message includes a note that reads "Leslie Mortgage Payment 9/16" and a link to access the payment. The notification message can be sent via the same or different social network site from which the payment message was sent.

In a further embodiment, if a debit or credit card is used, a photograph of the debit or credit card can be taken and provided with the message from the user, along with additional payment information. The payment is then verified, such as by ensuring that the user's name is on the credit card, that the address associated with the credit card is correct, and that available funds exist, as well as verifying other payment information associated with debit and credit cards.

Figure 3:
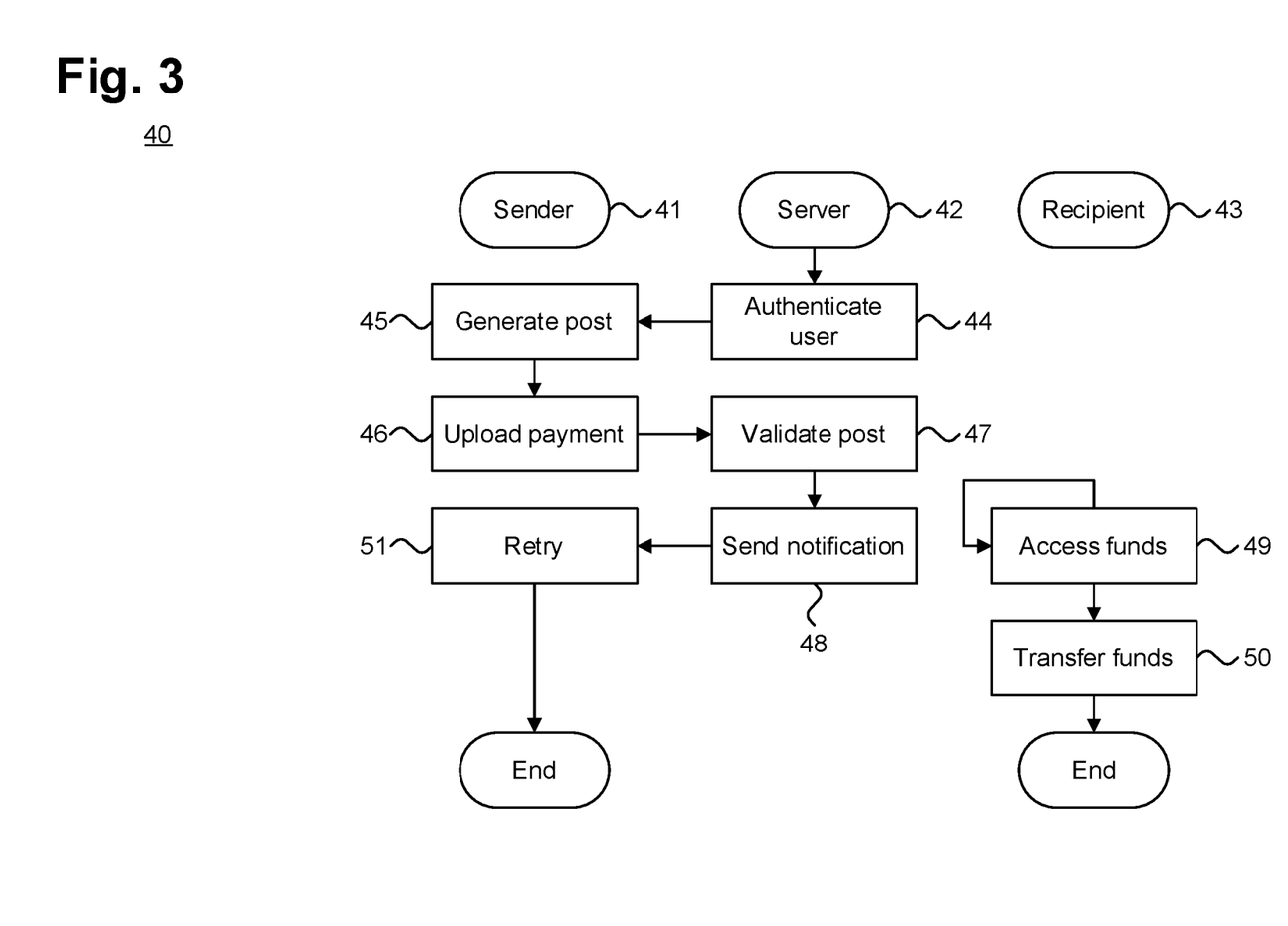
FIG. 3 is a flow diagram showing a process for the sending and receiving of a transaction.

FIG. 3 is a flow diagram showing a process 40 for sending and receiving a transaction. A user 41 logs into the transaction application 21 and the transaction server 42 authenticates (block 44) the user based on the computing device which the user uses to login. Once authenticated, the user can generate (block 45) a message to a recipient 43 via a social network site and upload (block 46) payment information, which is previously encrypted. Upon sending, the transaction server 42 performs (block 47) a validation process on the payment information to determine whether the information is valid. If valid, the transaction server 42 generates and delivers (block 48) a notification message to the recipient 43. Once received, the recipient 43 can access (block 49) the payment via a link in the notification message and transfer (block 50) the payment to a bank account, deposit account, or other type of account. If the payment information is not valid, the transaction server 42 generates and delivers (block 48) an error notification message to the user 41 and the user can correct and resend (block 51) the message with different payment information.

Figure 4:
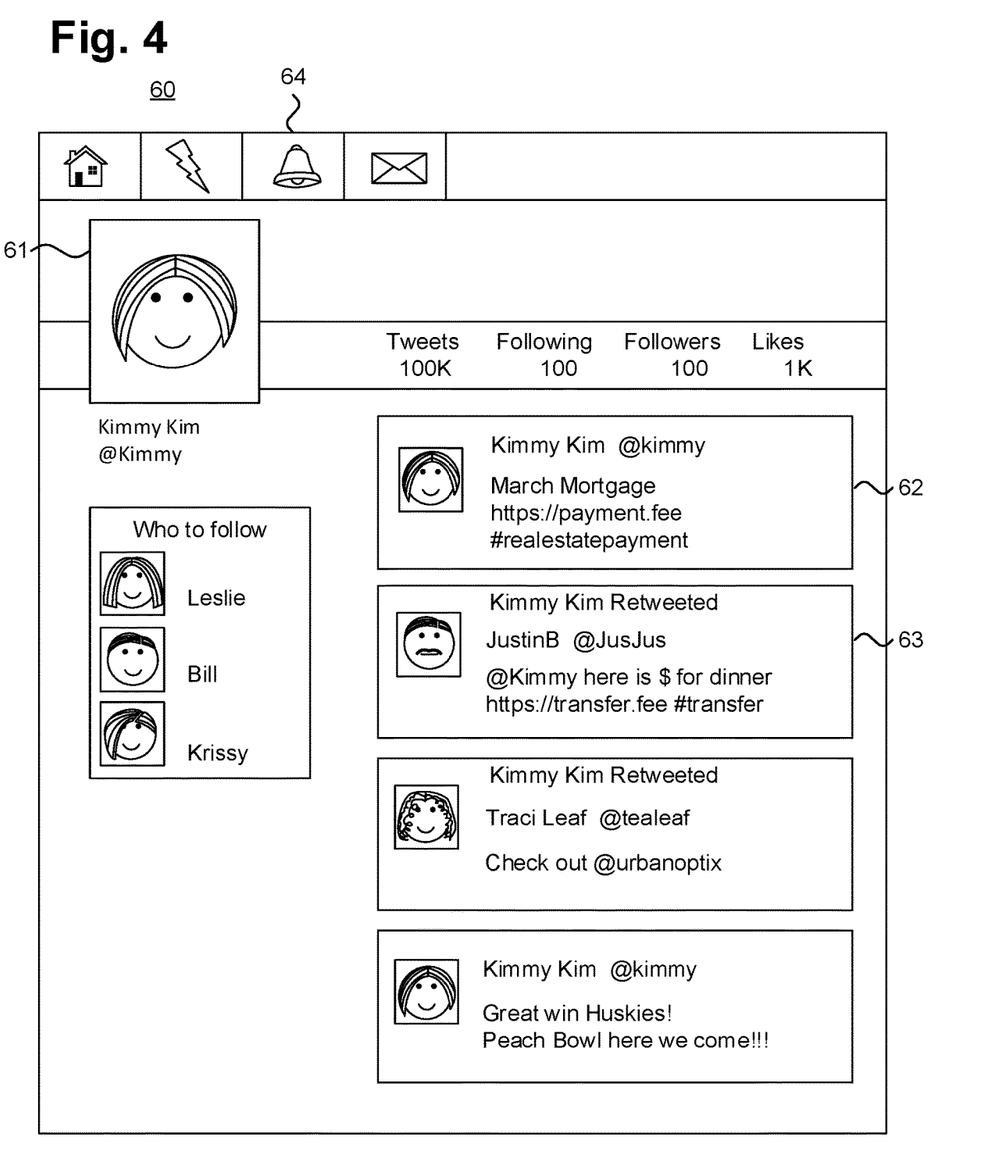
FIG. 4 is a block diagram showing a screenshot of a webpage for sending and receiving transactions.

FIG. 4 is a block diagram showing a screenshot of a webpage 60 for sending and receiving transactions. In this example, the webpage is a Twitter account for the user 61 Kimmy Kim. The webpage includes tweets from both Kimmy Kim and tweets from acquaintances or friends of Kimmy Kim, which are retweeted. In a first tweet 62, Kimmy Kim uploads payment information for payment of her March mortgage and enters the hashtag #realestatepayment, which indicates the recipient of the mortgage payment. Both the recipient and the payee will be able to view a history of the transaction within the authenticated chatbot contact, or social media site, using an associated bot. The next tweet 63 is a retweet of a tweet from Justin Story, which includes a notification that Justin sent payment to Kimmy Kim. Retweeting of the verified payment notification is optional and in a further embodiment, can merely be provided as a message under a notifications tab 64, which are displayed only to the recipient upon selection.

In a further embodiment, Snapchat can be used to send and receive the payment. For instance, a user can take a photograph of a check for payment to the recipient and snap a picture of the check to an account for the recipient. The message is accessed by the transaction server and the payment information can be processed and validated. If successfully validated, the recipient later receives a notification, such as via Snapchat with a link to access the money.

Other social networking sites can also be used to send and receive payment. For example, the user can send a message with the payment information to a recipient via Facebook Messenger. The user locates a profile of the recipient and selects to generate a message in Messenger to the recipient with payment information. The message is intercepted by the transaction application 21 and the payment information is verified. Once verified, a notification of the message and payment is transmitted to the recipient.

Figure 5:
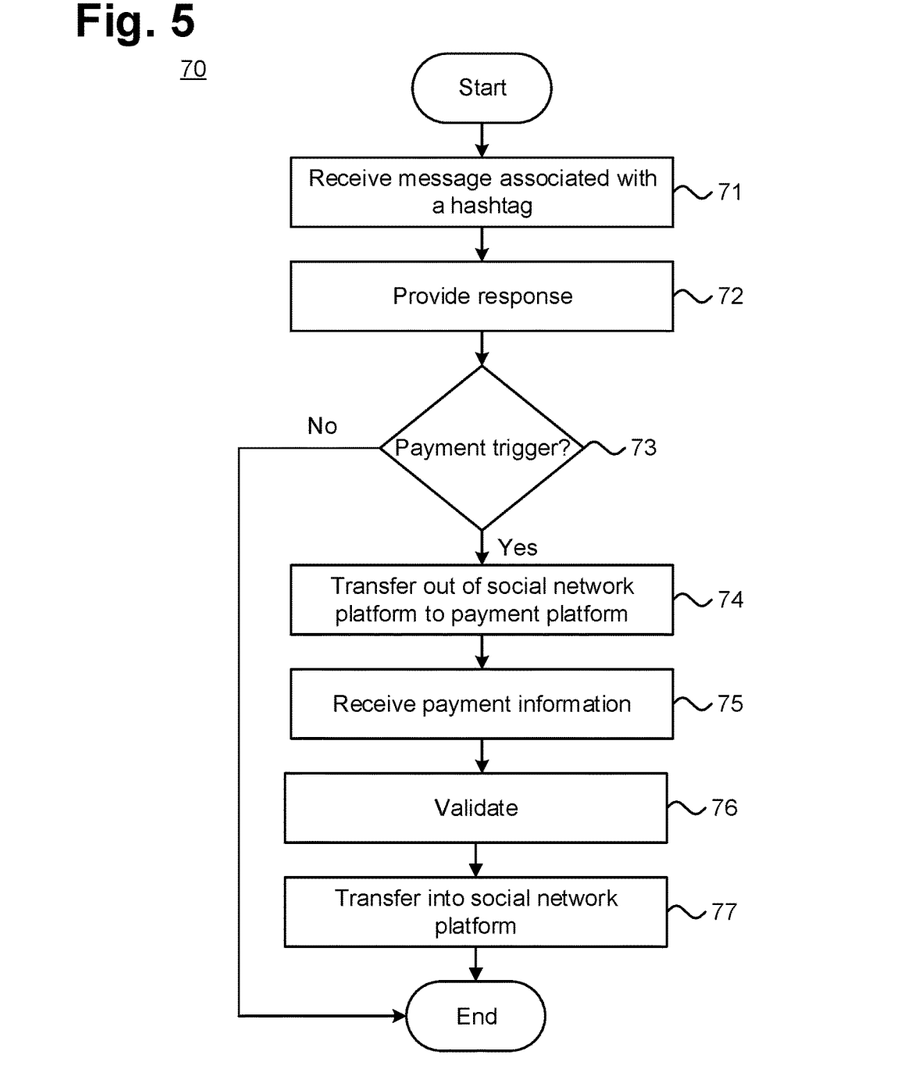
FIG. 5 is a flow diagram showing, by way of example, a method for intercepting messages with payment information.

Despite using separate platforms during a communication for payment transfer, the user or sender is generally unaware that a different system is processing the payment information. FIG. 5 is a flow diagram 70 showing, by way of example, a method for intercepting messages with payment information. A user wanting to make a payment or transfer funds to an individual or entity logs into their preferred social media account and generates a message (block 71) using a hashtag for the intended recipient of the payment or funds transfer. The message can include communication or a request to make a payment. In Facebook, the message can be generated in Messenger or in Twitter, the message can be generated via direct messaging. However, other types of social networks and messaging options are possible, such as postings in Facebook. One or more replies can be optionally provided (block 72) to the user from the recipient of the message, as scripted text via a chat bot. The scripted reply can include answers to any questions by the user, as well as requests for the user to provide payment information.

Communication can occur back and forth between the user and the chat bot until an indication is made that payment will be provided, which triggers a transfer of the user to a different communication platform, separate from the social network, that is secure for accepting payment. In one embodiment, the trigger is based on the user's request to pay. Alternatively, the chat bot, on behalf of the recipient, can ask the user for payment, and a response of the user agreeing to payment can act as a trigger for the transfer. The separate communication platform can follow certain payment standards for safe transactions, including the Payment Card Industry Data Security Standard, which outlines standards for organizations that accept credit card payments, since most social networks fail to comply with such standards. In one embodiment, the social network is run as part of one platform and the payment is made via the separate secure payment platform, including the transaction server shown in FIG. 1.

Once triggered (block 73), the user is transferred (block 74) to the separate secure payment platform for receiving payment information and validating the payment information. The secure payment platform can appear the same as the social network through which the communication was occurring so that the user is unaware of the transfer and different standards or protocols used via the secure payment platform. Thus, in one embodiment, the separate secure payment platform is designed to look the same as the social network site through which the user was originally communicating. However, in another embodiment, the design of the secure payment platform can differ from the social networking site.

Upon the transfer, the user provides payment information for the transaction, including transferring money, making a purchase, or paying a bill. The payment information is received (block 75) by the transaction server of FIG. 1, within the secure payment platform. Further, the payment information can be provided as a photograph of, for example, a payment source, including a check, credit card, debit card, money order, or other type of payment source and can be encrypted by the user. Once received the payment information can be decrypted and processed for validation (block 76). The validation process can occur, as described above, with respect to FIG. 2.

If the payment information is determined to be invalid, the user can provide additional or different payment information for further processing or can be transferred back to the social network site. However, if validated, the purchase, payment, or transfer can be completed, after which the user is transferred (block 77) back to the social network platform for further use. Finally, a notification can be optionally generated for sending to the recipient as notification of the payment transaction by the user. Additionally, a notification can be generated for sending to one or more contacts associated with the user. For example, the user may want to notify her husband that she paid the mortgage.

A user can also communicate with entities, such as a store, via a social network to ask questions about products or services, which can subsequently lead to payment of the product or service. For example, the user can generate a message to a store, such as Nordstrom, for asking a question about a particular product or item, using the hashtag #Nordstrom. Responses to the user can be provided via scripts, such as by a chat bot, on behalf of Nordstrom. After answering all the user's questions regarding the product, a message can be sent to the user asking whether the user wishes to purchase the product and if so, to please provide payment information. A "yes" response from the user can trigger transfer of the user to the secure payment platform for providing payment information, such as a picture of the user's credit card. Upon receipt, the payment information is processed and can be determined to be valid or invalid. If invalid, further payment information can be requested. However, if determined to be valid, the user's credit card is charged and upon completing the purchase, the user is transferred back to the social network platform for further use of the social network.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for performing social network secure transactions, comprising:
   a database configured to store a list of payment recipients each associated with a hashtag stored therein for a user;
   a server comprising a central processing unit, memory, an input port configured to receive the list of payment recipients from the database, and an output port, wherein the central processing unit is configured to:
      monitor a chat session of the user on a social network platform;
      identify during the chat session a message from the user associated with one of the hashtags and indicating a possible transfer of funds;
      trigger transfer of the chat session to a secure payment platform based on the identified message;
      receive from the user via the secure payment platform a message also associated with the one of the hashtags and comprising encrypted payment information for a payment transaction;
      provide to the user a view of the secure payment platform that substantially matches a view of the social network platform, wherein the user is unaware of the transfer to the secure payment platform;
      decrypt the payment information;
      perform validation of the decrypted payment information for the transaction;
      trigger a transfer of the user to the social network platform; and
      send to the recipient associated with the one of the hashtags a notification regarding the verified payment information for the payment transaction without further input from the user of the social network platform.

2. A system according to claim 1, wherein the database is further configured to store a profile for at least one of the user and the recipient.

3. A system according to claim 2, wherein the payment is transferred to an account stored in the profile for the recipient.

4. A system according to claim 1, wherein the encrypted payment information is provided to the social network platform as a photograph.

5. A system according to claim 1, wherein the database is further configured to store a log in which the transaction is recorded for at least one of the user and the recipient of the payment.

6. A system according to claim 1, wherein the notification is provided to the recipient via one of the same social network platform, a different social network platform, text messaging, and an email.

7. A system according to claim 1, wherein the central processing unit is further configured to provide a link in the notification to access the payment.

8. A system according to claim 1, wherein the payment information comprises at least one of a recipient name, a payment amount, a payment source, and a note to the recipient.

9. A system according to claim 8, wherein the payment source comprises one of a check, a debit card, and a credit card.

10. A system according to claim 1, wherein the decrypted payment information is validated by assigning a score to each piece of the decrypted payment information, summing the scores for the decrypted payment information, and validating the payment information when the summed score for the decrypted payment information exceeds a threshold.

11. A computer-implemented method for performing social network secure transactions, comprising:
    maintaining for a user a list of payment recipients each associated with a hashtag;
    monitoring a chat session of the user on a social network platform;
    identifying from the user during the chat session a message associated with one of the hashtags and indicating a possible transfer of funds;
    triggering transfer of the chat session to a secure payment platform based on the identified message;
    receiving via the secure payment platform a message also associated with the one of the hashtags and comprising encrypted payment information for a payment transaction;
    providing to the user a view of the secure payment platform that substantially matches a view of the social network platform, wherein the user is unaware of the transfer to the secure payment platform;
    decrypting the payment information;
    performing validation of the decrypted payment information for the transaction;
    triggering a transfer of the user to the social network platform; and
    sending to the recipient associated with the one of the hashtags a notification regarding the verified payment information for the payment transaction.

12. A method according to claim 11, further comprising:
    storing a profile for at least one of a sender of the message and a recipient of the payment.

13. A method according to claim 12, further comprising:
    transferring the payment to an account stored in the profile for the recipient.

14. A method according to claim 11, wherein the encrypted payment information is provided to the social network site as a photograph.

15. A method according to claim 11, further comprising:
    recording the payment transaction in a log for at least one of the user and the recipient of the payment.

16. A method according to claim 11, further comprising:
    providing the notification to the recipient via one of the same social network platform, a different social network platform, text messaging, and an email.

17. A method according to claim 11, further comprising:
    providing in the notification a link to access the payment.

18. A method according to claim 11, wherein the payment information comprises at least one of a recipient name, a payment amount, a payment source, and a note to the recipient.

19. A method according to claim 18, wherein the payment source comprises one of a check, a debit card, and a credit card.

20. A method according to claim 11, further comprising:
    validating the decrypted payment information, comprising:
        assigning a score to each piece of the decrypted payment information;
        summing the scores for the decrypted payment information; and
        validating the payment information when the summed score for the decrypted payment information exceeds a threshold.

* * * * *